United States Patent [19]

DeRuiter et al.

[11] Patent Number: 4,722,953

[45] Date of Patent: Feb. 2, 1988

[54] METHOD OF PRODUCING BITUMINOUS/POLYMER EMULSION AND PRODUCT

[75] Inventors: David J. DeRuiter, Castro Valley; Dennis P. Fairley, Berkeley, both of Calif.

[73] Assignee: Davlin Paint Company, Berkeley, Calif.

[21] Appl. No.: 790,745

[22] Filed: Oct. 24, 1985

Related U.S. Application Data

[63] Continuation-in-part of Ser. No. 562,433, Dec. 16, 1983, abandoned.

[51] Int. Cl.$^4$ ............................................. C08L 1/26
[52] U.S. Cl. ........................................ 524/44; 524/46; 524/60; 524/62; 524/69; 524/71; 106/277; 106/201; 106/202; 106/270
[58] Field of Search ............... 524/44, 46, 60, 62, 524/69, 71; 106/277, 270, 201, 202

[56] References Cited

U.S. PATENT DOCUMENTS

| | | | |
|---|---|---|---|
| 3,442,841 | 5/1969 | Adelman | 260/28.5 |
| 3,567,476 | 3/1971 | Masciantonio | 106/277 |
| 3,635,863 | 1/1972 | Drukker | 260/27 |
| 3,869,417 | 3/1975 | Ramsay | 260/28.5 |
| 3,904,428 | 9/1975 | McConnaughay | 106/278 |
| 3,956,002 | 3/1976 | Moorer | 106/277 |
| 3,957,524 | 5/1976 | Doughty et al. | 106/277 |
| 4,018,730 | 4/1977 | McDonald | 260/17.4 R |
| 4,056,401 | 11/1977 | De Bough | 106/277 |
| 4,073,659 | 2/1978 | Burris | 106/277 |
| 4,088,505 | 5/1978 | Moorer | 106/277 |
| 4,193,816 | 3/1980 | Ferm | 106/277 |
| 4,268,318 | 5/1981 | Stone | 106/277 |

FOREIGN PATENT DOCUMENTS 1387367  12/1964  France .

*Primary Examiner*—Melvyn I. Marquis
*Attorney, Agent, or Firm*—James R. Cypher

[57] ABSTRACT

The present invention relates to bituminous polymer emulsions and more particularly to a novel method for producing such emulsions to produce a coating which yields superior flexiblity and water resistance.

The method of producing the bituminous polymer consists in passing heated asphalt and a heated polymer emulsion through a colloid meal. The resultant emulsion may have up to 75% solids.

9 Claims, No Drawings

METHOD OF PRODUCING BITUMINOUS/POLYMER EMULSION AND PRODUCT

BACKGROUND

This application is a continuation-in-part application of our earlier co-pending U.S. application entitled, "METHOD OF PRODUCING BITUMINOUS/POLYMER EMULSION", Ser. No. 06/562,433, filed Dec. 16, 1983 and now abandoned.

Current asphalt mixtures for roofs, for instance, are applied to wood, usually using an intermediate layer of roofing paper, or felt between the asphalt and wood. Such asphalt mixtures are sometimes cold-applied as an emulsion or solution. Others are hot-laid (hot tar) necessitating an expensive and often hazardous heating step prior to appication. All unmodified asphalt mixtures exhibit immediate or eventual brittleness thus necessitating a layer of roofing paper to act as a coating membrane. And whereas cold-blended modified asphalt emulsions may exhibit flexibility, they are undesirable as waterproof coatings due to their excessive surfactant (emulsifier) level. The prior art generally shows the formation of asphalt emulsions by adding the asphalt to water with mixing (generally high shear, with a colloid mill, for instance) and chemicals such as emulsifiers or dispersants). The chemicals added to the asphalt may include polymers (to improve flexibility, extensibility and toughness) emulsifiers, dispersants, and clays, fillers, and pigments. These are added to the molten asphalt, or to the asphalt emulsion after the asphalt emulsion is formed by simple mixing or blending procedures.

Heretofore, the use of liquid bituminous emulsions have centered on various emulsification systems that relate to the bituminous materials themselves or with other materials, but, almost always, the colloidal dispersion of these bituminous materials involved a single process wherein the bituminous material alone or in conjunction with other materials was emulsified in a single mixer or phase prior to their colloidal dispersion.

Masciantonio, U.S. Pat. No. 3,567,476 discloses a method of coloring bituminous materials with a two part process wherein an emulsifying agent diluted with hot water is introduced into the dispersion system (colloid mill) separately from the bituminous material, but the invention has the other "resinous" materials "post-added" or "cold blended" after the bituminous material has been emulsified.

Aqueous bituminous emulsions normally consist of emulsifiers such as clays, or combinations of cationic, nonionic or anionic emulsifying agents. The surface active agents are necessary to provide emulsion stability. After the emulsion particles coalesce, their presence detracts from water resistance properties. Similarly, emulsion polymerization of acrylate, vinyl, styrene butadiene, ethylene, acrylonitrile and combinations of these monomers requires the presence of surface active agents and protective colloids such as methyl cellulose or hydroxyl ethyl cellulose to stabilize the emulsion polymers so formed.

The combination of these two emulsion classes has been readily accomplished when the type of emulsifying agents are compatible and protective colloid type and pH allows a stable mixture. The addition of polymer emulsion to the asphalt emulsion improves generally:

(a) fuel resistance
(b) chemical resistance
(c) ultra violet resistance
(d) mechanical characteristics of coating such as higher elongation and low temperature flexibility.

However, the emulsifying agents which exist on the colloidal particle surfaces detract from cohesive bond strength between the polymer/bitumen particles and also contribute to formation of air voids leaving the coalesced film permeable to moisture vapor or liquid. The emulsifying agents retain some degree of water solubility and also the ability to solvate the polymer and bitumen particles. This adversely affects water resistance of cured material.

The primary objective is to produce coatings which yield both superior flexibility and water resistance. These coatings are most likely to be used on roof or wall surfaces, but may also be used in basements or on foundations, on paper or cardboard for moisture resistant packaging, lumber for building construction, steel surfaces as a corrosion barrier, or many other optional uses. The coating may be applied by brush, roller, or squeeges, but may also be applied by doctor blade, spray, dip or other reasonable practice of the art.

The new emulsion may be cold laid. It has superior characteristics to present bituminous emulsions such as asphalt or coal tar.

This invention relates to an improved method of producing bituminous/polymer emulsion combinations by means of introducing a previously emulsified polymer into the dispersion process separately from the unemulsified bituminous material thereby utilizing the emulsifiers within the polymer to emulsify the bituminous liquid thus forming a newly modified bituminous material with lower emulsifier concentration.

These bituminous emulsion/polymer emulsion combinations are found to be extremely water resistant after curing. In addition, they possess other advantageous physical, mechanical and rheological characteristics which cold blends of like materials lack.

It is accordingly one of the objects of the present invention to provide an asphalt emulsion which may be spread directly on wood, concrete or other construction material surfaces without the use of an intermediate layer of fiberous material, such as felt or paper.

It is another object of this invention to provide an asphalt emulsion which may be cold laid and subsequently dries without blistering and with little air entrainment. The asphalt polymer emulsion also dries rapidly due to the reduced surfactant levels. Unmodified, it has dilantant flow characteristics allowing greatly enhanced penetration into voids and cracks on horizontal surfaces.

Another object of the present invention is to provide a cold-laid bituminous emulsion which may be applied to wet surfaces, e.g. wood or concrete.

It is yet another object of the present invention to provide a cold-laid bituminous emulsion which is capable of expanding or contracting with heat or cold without cracking.

While the immediate use of this invention is in the field of structural surface coatings for roofs, especially precast or in situ concrete roofs or in the refurbishing of existing built up roof systems, it is understood that the invention is not restricted to these ends.

Another objective of this process invention is to reduce the total quantity of emulsifiers needed for the modified asphalt emulsion.

DESCRIPTION OF THE PREFERRED EMBODIMENTS

The process for the production of the bituminous polymer emulsion is detailed as follows:

The asphalt is heated to 250° F. and optionally a high melting point wax (165° F.) is added to the melt. The emulsion polymer at 50–55% solids is either cooled from the emulsion polymerization process to approximately 145° F. or heated in batch quantities from previous production to approximately 145° F. A defoaming agent such as "Dow Corning-H-10" silicone emulsion may be added at 0.2 to 0.5 by wt. of polymer emulsion. The asphalt/wax blend is passed simultaneously with the polymer emulsion at 40 p.s.i. air pressure through a colloid mill at about 3500 RPM with a mix ratio of asphalt blend/polymer emulsion of 70-20/30-80, respectively, producing an emulsion of asphalt within the water phase of the polymer emulsion. The product emulsion exits the mill at a temperature of 160°-170° F. and is immediately cooled to approximately 120° F. using heat exchangers. Slow agitation must be provided to maintain uniform temperatures while cooling and prevent localized over heating. The resultant emulsion is approximately 70% solids and exhibits dilatant flow properties.

The emulsions produced are of fine particle size microscopically sized at 2 to 10 microns. The polymer particles range from 0.1–0.25 microns.

The emulsions are brown in color when in the wet state but dry black. Addition of carbon black at 1–3% by Wt. of total emulsion solids will produce a black color in the wet state.

The pH of the ethylene/vinyl acetate based emulsions is normally 4.0–5.0 and should be maintained below 7.0. Other emulsions, e.g., styrene butadiene, may require alkaline pH.

The emulsions so produced exhibit excellent package stability at 120° F. for six months.

Asphaltic materials are normally selected on the basis of physical properties such as penetration, viscosity and ductility. Hardness as measured by penetration values is a major limiting factor in the use of these materials due to reduced or insufficient flexibility and inability to resist cracking due to substrate movement.

| TEST PROCEDURES | |
|---|---|
| Penetration | ASTM D-5 |
| Ductility | ASTM D-113 |
| Softening Pt. | ASTM D-36 |

Softening points range of the asphaltic/coal tar pitch must be maintained above 120° F. since the material remains thermoplastic and use areas of high ambient air temperature will require high softening points to avoid migration or deformation of the dried coating material.

EXAMPLE 1

A monomer mixture consisting of 65% vinyl acetate, 20% ethylene, 15% acrylic (2 ethylhexyl acrylate) was polymerized in water using normal technique and using surfactant blend of nonionic and anionic surfactants typically and protective colloid (hydroxyl ethyl cellulose).

The structure of 2-ethylhexyl acrylate is:

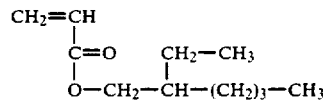

The emulsion had the following properties:

| 1. Tensile Strength | 420 psi |
|---|---|
| 2. Elongation | 500% |
| 3. % Solids | 55 |
| 4. pH | 4.0 |
| 5. Clarity | white/opaque |

The emulsion was cooled to room temperature and stored for seven days. A defoamer was added such as "Dow Corning H-10" Silicone emulsion at 0.27. The emulsion mixture was then heated to approximately 145° F. and pumped through a colloid mill at 40 psi air pressure concurrently with an asphalt heated to 250° F. The ratio of asphalt to polymer emulsion entering the colloid mill was 1 to 2 by weight of solid polymer and asphalt. The exit temperature was 160°-170° F. The solids were 70% by weight and the color was dark brown. The resultant emulsion exhibited good storage stability and the film showed good flexibility, extensibility and resistance to moisture. Upon air drying it formed a continuous film, free from mudcracking. It was capable of more elongation than an asphalt emulsion without the polymer.

EXAMPLE 2

The above emulsion was processed with an asphalt/wax blended at a proportion of 90/10% by weight. The ratio of asphalt/wax to polymer emulsion entering the colloid mill was 1 to 1 by weight of solid polymer and asphalt. The resultant emulsions exhibited the same characteristics as in example 1 with improved flow characteristics and moisture resistance.

EXAMPLE 3

Commercial emulsion "Elvace 1877" manufactured and sold by Reichhold was heated to 145° F. and the same process and ratios were followed as in example 2. The resultant polymer/asphalt emulsion had the same characteristics as in example 2. "Elvace 1877" is manufactured by the Emulsion Polymer Division, Reichhold, Dover Del., and is ethylene/vinyl acetate having the structure:

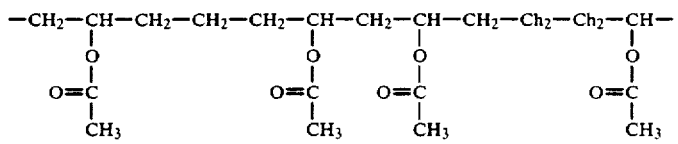

Stability data for selected samples above are shown in table 1.

TABLE 1

| Viscosity (centipoise) Temp 77° F. |
|---|

TABLE 1-continued

| Example | 1 day | 1 week | 2 weeks | 6 months |
|---------|-------|--------|---------|----------|
| 2 | 2000 | 3000 | 3000 | 4000 |
| 3 | 4500 | 4400 | 4500 | 4900 |

| Viscosity (centipoise) Temp 120° F. | | | | |
|---------|-------|--------|---------|----------|
| Example | 1 day | 1 week | 1 month | 6 months |
| 2 | 3000 | 3000 | 3300 | 3900 |
| 3 | 4000 | 4500 | 4400 | 5000 |

EXAMPLE 4

1. Preheat asphalt to 240°-250° F.
2. Add "Aristowax 165" (a fully refined parafin wax with a melting point of 156°-165° F. manufactured by Union Oil of California), 15% on asphalt solids
3. Add 1% by weight oleic acid and 1% by weight emulsifier such as an amine long-chain alcohol sulfate manufactured by DuPont de Nemours Company and sold under the trademark "DUPONOL W.S."
4. Preheat "Elvace 1877" Reichhold polymer emulsion to 145° F. under agitation
5. Add 8 lbs./100 gallons "Dow Corning H-10" defoamer (Dow Corning) to "Elvace 1877"
6. Emulsify by means of a colloid mill at 3500 rpm with mix ratio by volume: 40% asphalt to 60% "Elvace 1877" emulsion The resultant emulsion is: 72% solids and exhibits dilatant flow properties.

This vehicle system has shown very good early water resistance and low moisture vapor transmission.

The addition of the "Aristowax 165", refined parafin reduces the viscosity of the "AR 8000" asphalt and allows emulsification at lower temperatures. "AR 8000" asphalt is sold by Huntway Refining Company of Northern California of Benecia, Calif. and has a soft point of 115, a viscosity of 55 CST at 350° F., a flash point of 530° F. and original penetration at 77° F. of 53.

The emulsions produced are of small particle size when viewed microscopically at 100x and the procedure for producting small particle size emulsions must be standardized for production batches to ensure control.

1. Ingredient materials

| | | |
|---|---|---|
| (a) | "AR 8000" asphalt cement (Huntway Refining Company) graded by viscosity according to ASTM D 3381 | 32.5 Lbs. |
| (b) | "Aristowax 165" (Union Oil Company) | 2.6 Lbs. |
| (c) | "Elvace 1877" EVA emulsion (Reichhold) | 4 Gals. |
| (d) | "Dow Corning H 10" defoamer | 20 gms. |
| (e) | BASF Wyandotte "Pluronic L61" surfactant | 20 gms. |
| (f) | Aqueous carbon black dispersion-various suppliers | 200 gms. |
| (g) | Water | 1 Gal. |

2. Procedure (a) Heat asphalt on hot plate to 180°-200° F.
(b) Break up wax and add to asphalt with agitation, heat to 220°-230° F.
(c) Preheat asphalt pressure pot and add above mixture
(d) Add water to "Elvace 1877" EVA (Reichhold) emulsion and heat in a *closed* container to 120°-130° F.
(e) Add defoamer"H10" (Dow Corning)
(f) Add "Pluronic L61" (BASF Wyandotte) which is a surfactant having an average moleculr weight of 2000, a liquid having a Brookfield viscosity of 325 cps, a specific gravity of 1.01 at 25° C., a cloud point of 24° C. in a 1% aqueous solution and a pour point of −29° C.
(g) Add carbon black-mix 5-10minutes then pour emulsion mixture into preheated pressure pot.
  Preheat the pressure pot with hot (120° F. water) and drain just prior to adding latex mixture
(h) Preheat lines from asphalt pressure pot to colloid mill
(i) Pressurize both latex and asphalt pots to 20-25 psi
(j) Open valve from latex pressure pot and start colloid mill
(k) Open valve from asphalt pot slowly until viscous dark brown product emulsion emerges.
  Temperature of the product emulsion should be 160°-170° F.
(l) Continously agitate the product emulsion while it cools to prevent its surface from skinning.
(m) Continue agitation until mixture is below 110° F. and seal in lined cans.

The product emulsion should be agitated at exit to prevent localized exposure to elevated temperature since in bulk the central area will tend to cool very slowly and tend to destabilize the emulsion and create lumps or agglomerates.

It has been found that the preparation of emulsion polymers with particle size of 0.1-0.3 microns prepared with anionic and nonionic surfactants at very low levels—1-3% based on total monomer solids with optionally 0.2-0.5% protective colloid such as hydroxylethyl cellulose—can be used to co-emulsify coal tar pitch or asphalt to produce stable emulsions of polymer/asphalt-/coal tar which consist of from 20-70% asphalt solids and from 80-30% polymer solids. The resultant emulsion may have up to 75% total solids in the above proportions of polymer/bitumen.

The optional use of crystalline hydrocarbon waxes such as "Aristowax 165" (Union Oil Co.) melted into the liquid asphalt at levels of 10-15% based on wt. of asphalt has also provided improved water resistance in the polymer/asphalt films produced. The addition of wax to the asphalt mixture tends to lower the melt viscosity with resultant improved processing time.

The emulsions produced by mixing molten asphalt with latex generally exhibit dilatant flow properties (good penetration into porous substrates but difficult to atomize through an airless spray) which are advantageous in their use as horizontal roof coatings and horizontal surface sealers. The emulsion exhibits superior water resistance, excellent resistance to re-emulsification and very low moisture vapor transmission rates. Depending on the polymer type, molecular weight, particle size distribution, and the physical properties of the bituminous material, the resultant dry film will vary in cohesive or adhesive strength, elongation and tensile properties, and solvent or chemical resistance properties.

Alternatives to asphalt to be used in conjunction with or instead of, may include coal tars, lignite or gilsonite. Commercially typical asphalts might be Huntway AR-4000 and AR-8000. The asphaltic material used ranged in physical properties with ring and ball softening points of 110°-160° F.(the American Society for testing and Materials, ASTM D36-76), ductility +100 cm (ASTM D113-79) and penetration ranges of 20-70 at 77° F.(ASTM D5-73;reapproved 1978)

The physical properties of the polymer eaulsion should complement those of the bituminous material (i.e.) low glass transition temperature with high distensibility and elongation. Polymer emulsions used herein as preferred embodiments of the invention and cited herein but not excluded hereto were produced from vinyl acetate, ethylene and acrylic monomer combinations exhibiting dry film properties as follows:

(a) Glass transition temperature = 0° to −5° C.
(b) Elongation % 500–1000 (15 mil dry film)
(c) Tensile strength psi 600–1000 (15 mil dry film)
(d) pH 4.0–4.5
(e) Solids 50–55%

Alternative emulsion copolymers that may be considered include: acrylics, acrylic-methaacrylic copolymers, styrene butadiene copolymers, butadiene-acrylonitrile, butyl rubber emulsions, vinyl chloride copolymers, vinyl acetate copolymers and vinylidene chloride copolymers.

These bituminous emulsion/polymer emulsion combinations are found to be extremely water resistant after dying. In addition, they possess other advantageous physical, mechanical and rheological characteristics which cold blends of like materials lack.

We claim:

1. A method of producing a flexible and water resistant modified asphaltic coating comprising:
   a. simultaneously passing asphalt heated to about 250° F. and a polymer emulsion of a monomer selected from the group consisting of ethylene/vinyl acetate and an acrylate heated to approximately 145° F. through a colloid mill producing an emulsion of asphalt within the water phase of the polymer emulsion with the product emulsion at a temperature of 160°–170° F.;
   b. immediately cooling said product emulsion exiting said colloid mill to approximately 120° F.; and
   c. simultaneously continuously agitating said product emulsion exiting said colloid mill while said product emulsion is cooling until said 120° F. temperature is reached.

2. A method as claimed in claim 1 including the step of:
   a. melting a high melting point wax melting at 156° to 165° F. into said asphalt while heating said asphalt.

3. A method as claimed in claim 1 wherein said emulsion polymer is ethylene/vinyl acetate which includes the structure:

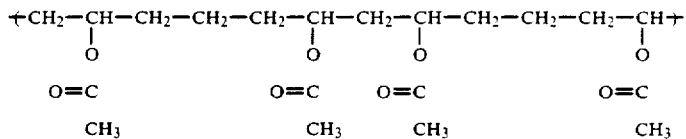

4. A method as claimed in claim 1 wherein said polymer emulsion consists of a monomer mixture of approximately 65% vinyl acetate, 20% ethylene and 15% (2-ethylhexyl acrylate) polymerized in water and using a surfactant blend of nonionic and anionic surfactants typically and a protective colloid of hydroxylethyl cellulose.

5. A method as claimed in claim 2 wherein said asphalt and wax is blended in the proportion of 90%–10% by weight.

6. A method as claimed in claim 2 wherein the ratio of said asphalt in the asphalt/wax blend and solid polymer in the polymer emulsion is 1 to 1 by weight of asphalt to solid polymer.

7. A method as claimed in claim 1 including the step of
   adding a defoaming agent to said polymer emulsion after heating and prior to passing said emulsion through the colloid mill.

8. The flexible and water resistant bituminous/polymer emulsion coating obtained by the process steps comprising
   a. simultaneously passing asphalt heated to about 250° F. and a polymer emulsion of a monomer selected from the group consisting of ethylene/vinyl acetate and an acrylate heated to approximately 145° F. through a colloid mill producing an emulsion of asphalt within the water phase of the polymer emulsion with the product emulsion at a temperature of 160°–170° F.;
   b. immediately cooling said product emulsion exiting said colloid mill to approximately 120° F.; and
   c. simultaneously continuously agitating said product emulsion exiting said colloid mill while said product emulsion is cooling until said 120° F. temperature is reached.

9. The product of claim 8 wherein said emulsion polymer is an aqueous of ethylene/vinyl acetate.

UNITED STATES PATENT AND TRADEMARK OFFICE
CERTIFICATE OF CORRECTION

PATENT NO.   : 4,722,953

DATED        : February 2, 1988

INVENTOR(S) : David J. DeRuiter and Dennis P. Fairley

It is certified that error appears in the above-identified patent and that said Letters Patent is hereby corrected as shown below:

Face page, Abstract, line 7, "meal" should read -- mill --.

Column 7, line  1, delete "eaulsion" insert ---emulsion---

Column 7, line 31, delete "dying" insert ---drying---

Column 8, line 51, after the words "an aqueous" insert ---emulsion---

Signed and Sealed this

Fifth Day of July, 1988

Attest:

Attesting Officer

DONALD J. QUIGG

Commissioner of Patents and Trademarks